(12) United States Patent
Loh et al.

(10) Patent No.: US 10,619,424 B2
(45) Date of Patent: Apr. 14, 2020

(54) MULTI-PURPOSE THROUGH CONDUIT WET-MATE CONNECTOR AND METHOD

(71) Applicants: Yuh Loh, Cypress, TX (US); Paul Joseph, Missouri City, TX (US)

(72) Inventors: Yuh Loh, Cypress, TX (US); Paul Joseph, Missouri City, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 5 days.

(21) Appl. No.: 16/012,093

(22) Filed: Jun. 19, 2018

(65) Prior Publication Data

US 2019/0017332 A1 Jan. 17, 2019

Related U.S. Application Data

(60) Provisional application No. 62/532,059, filed on Jul. 13, 2017.

(51) Int. Cl.

| | | |
|---|---|---|
| *E21B 17/02* | (2006.01) | |
| *H01R 13/52* | (2006.01) | |
| *E21B 34/06* | (2006.01) | |
| *E21B 21/10* | (2006.01) | |
| *E21B 23/04* | (2006.01) | |
| *F16L 37/34* | (2006.01) | |

(Continued)

(52) U.S. Cl.
CPC ............ *E21B 17/02* (2013.01); *E21B 17/028* (2013.01); *E21B 21/10* (2013.01); *E21B 23/04* (2013.01); *E21B 34/066* (2013.01); *F16L 37/34* (2013.01); *F16L 37/373* (2013.01); *H01R 13/5202* (2013.01); *E21B 43/08* (2013.01); *E21B 43/10* (2013.01); *E21B 43/29* (2013.01); *H01R 13/523* (2013.01)

(58) Field of Classification Search
CPC ........ E21B 17/02; E21B 17/028; F16L 37/34; F16L 37/373

See application file for complete search history.

(56) References Cited

U.S. PATENT DOCUMENTS 3,989,330 A * 11/1976 Cullen .................. E21B 17/028
439/194
5,090,448 A * 2/1992 Truchet .................... F16L 37/23
137/614.03

(Continued)

FOREIGN PATENT DOCUMENTS

EP 0122987 A1 10/1984
WO WO-2015103499 A1 * 7/2015

OTHER PUBLICATIONS

Notification of Transmittal of the International Search Report and the Written Opinion of the International Searching Authority, or the Declaration; PCT/US2018/041191; dated Nov. 29, 2018; 10 pages.

*Primary Examiner* — Nicole Coy
(74) *Attorney, Agent, or Firm* — Cantor Colburn LLP

(57) ABSTRACT

A connection system including a male connector portion and a female connector portion each including a housing, a valve disposed within the housing, a valve actuator operably connected to the valve, and a housing extension, the housing extension from the male connector portion being configured to interact with the valve actuator of the female connector portion to open the valve of the female connector portion during mating of the male and female connector portions.

14 Claims, 5 Drawing Sheets

(51) Int. Cl.
*F16L 37/373* (2006.01)
*H01R 13/523* (2006.01)
*E21B 43/08* (2006.01)
*E21B 43/10* (2006.01)
*E21B 43/29* (2006.01)

(56) References Cited

U.S. PATENT DOCUMENTS

| | | | | |
|---|---|---|---|---|
| 6,142,237 | A * | 11/2000 | Christmas | E21B 17/028 |
| | | | | 166/376 |
| 7,028,982 | B2 * | 4/2006 | Kohda | F16L 37/23 |
| | | | | 137/614.01 |
| 7,343,931 | B2 * | 3/2008 | Packham | F16L 37/32 |
| | | | | 137/614.03 |
| 7,806,139 | B2 * | 10/2010 | Packham | A61M 39/10 |
| | | | | 137/614.04 |
| 7,874,313 | B2 * | 1/2011 | Kouda | F16L 37/373 |
| | | | | 137/614.03 |
| 8,397,756 | B2 * | 3/2013 | Packham | A61M 39/10 |
| | | | | 137/614.05 |
| 2006/0243454 | A1 * | 11/2006 | Bolze | E21B 17/02 |
| | | | | 166/380 |
| 2007/0272314 | A1 | 11/2007 | Packham | |
| 2008/0029274 | A1 | 2/2008 | Rytlewski et al. | |

\* cited by examiner

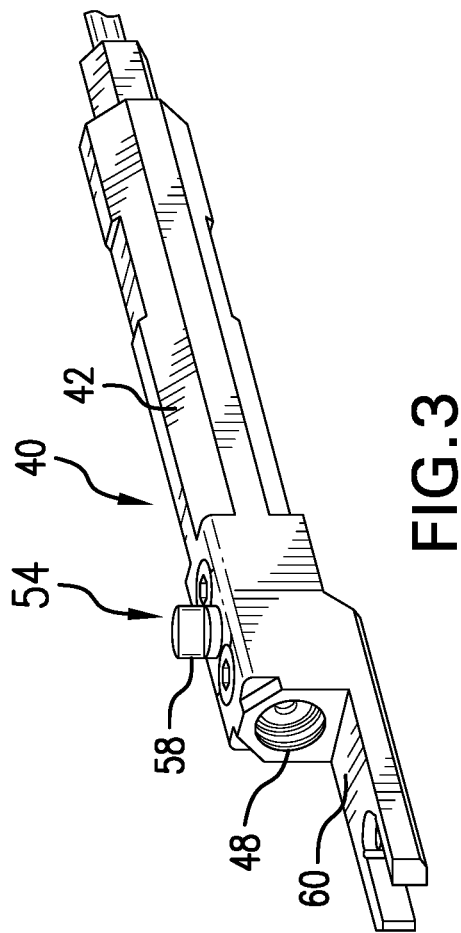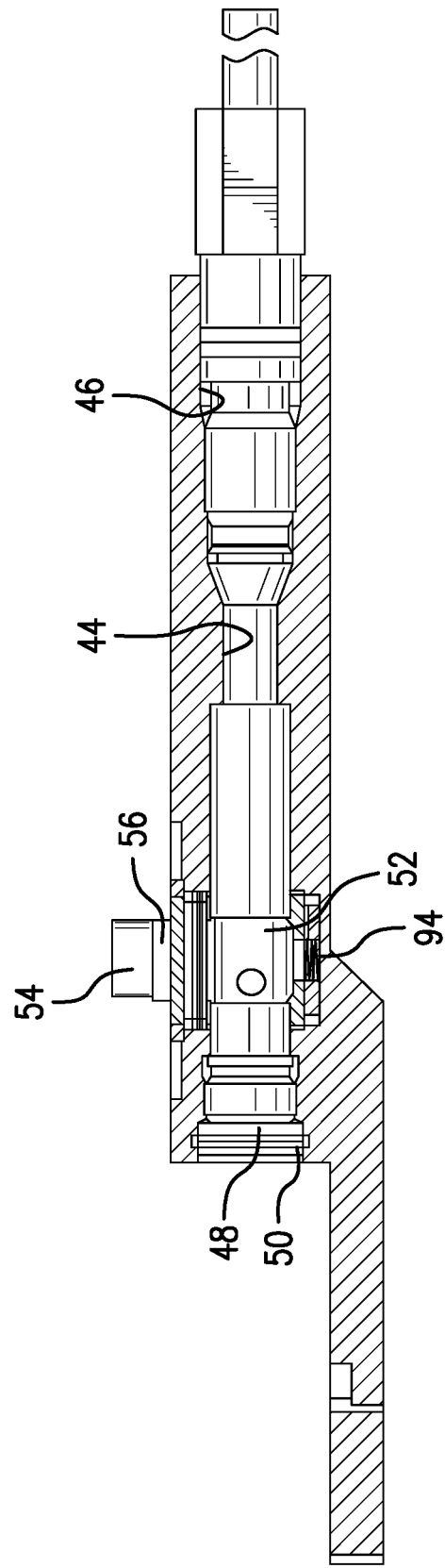

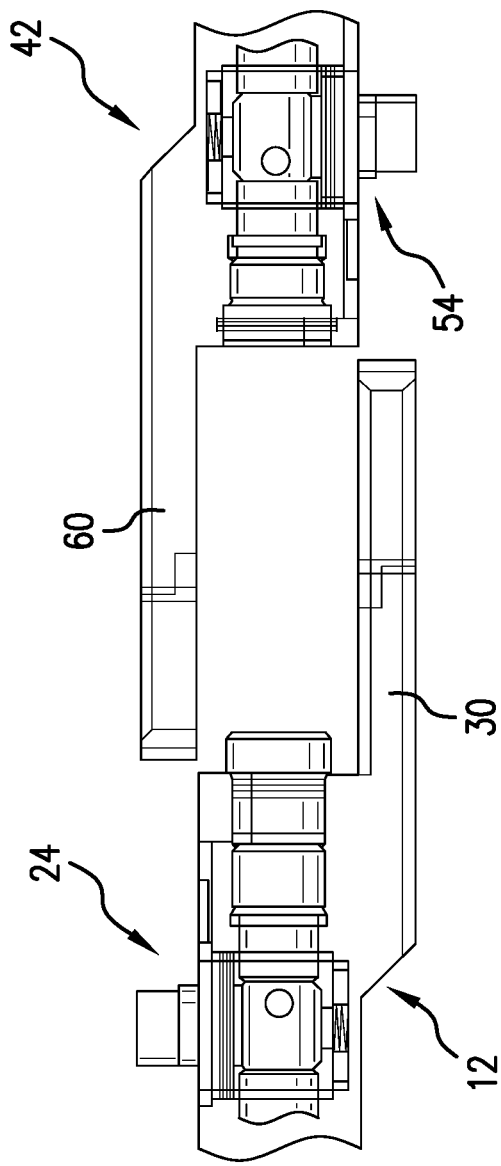
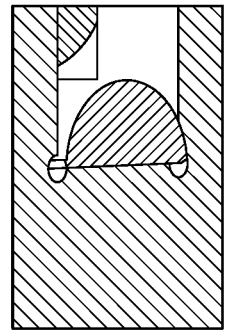
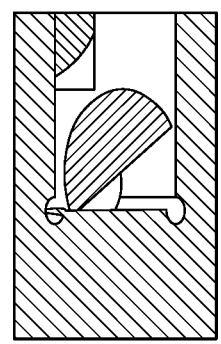
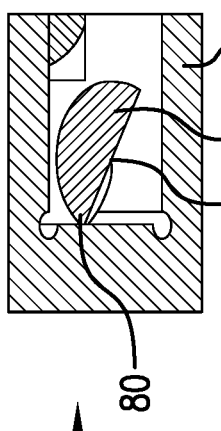
FIG. 8
FIG. 9A  FIG. 9B  FIG. 9C

MULTI-PURPOSE THROUGH CONDUIT WET-MATE CONNECTOR AND METHOD

CROSS REFERENCE TO RELATED APPLICATIONS

This application claims the benefit of an earlier filing date from U.S. Provisional Application Ser. No. 62/532,059 filed Jul. 13, 2017, the entire disclosure of which is incorporated herein by reference.

BACKGROUND

In the resource recovery industry, making connections such as fluid, electrical, optic, etc. is often required to support normal operations. In view of the ever changing requirements and working conditions, available connection regimes may not address all needs and hence the industry is always receptive to new and alternative connection configurations.

SUMMARY

A connection system including a male connector portion and a female connector portion each including a housing, a valve disposed within the housing, a valve actuator operably connected to the valve, and a housing extension, the housing extension from the male connector portion being configured to interact with the valve actuator of the female connector portion to open the valve of the female connector portion during mating of the male and female connector portions and the housing extension from the female connector portion being configured to interact with the valve actuator of the male connector portion to open the valve of the male connector portion during mating of the male and female connector portions.

A method for connecting a conduit including bringing the male connector portion and the female connector portion.

A borehole system including a connection system.

BRIEF DESCRIPTION OF THE DRAWINGS

The following descriptions should not be considered limiting in any way. With reference to the accompanying drawings, like elements are numbered alike:

FIG. 3 is a perspective view of a female connector portion of a connection system disclosed herein;

FIG. 4 is a cross sectional view of the female connector portion of FIG. 3;

FIG. 8 is a side view of the male connection portion and the female connection portion being brought together;

FIGS. 9A-C illustrated the positional change of a valve actuator as an opposing housing extension interacts with the valve actuator.

DETAILED DESCRIPTION

A detailed description of one or more embodiments of the disclosed apparatus and method are presented herein by way of exemplification and not limitation with reference to the Figures.

Figure 1:
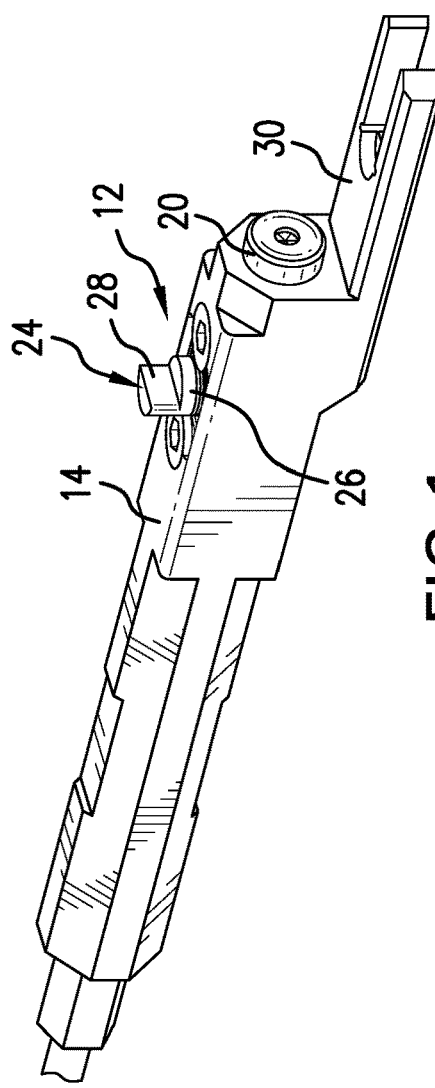
FIG. 1 is a perspective view of a male connector portion of a connection system disclosed herein.
Figure 2:
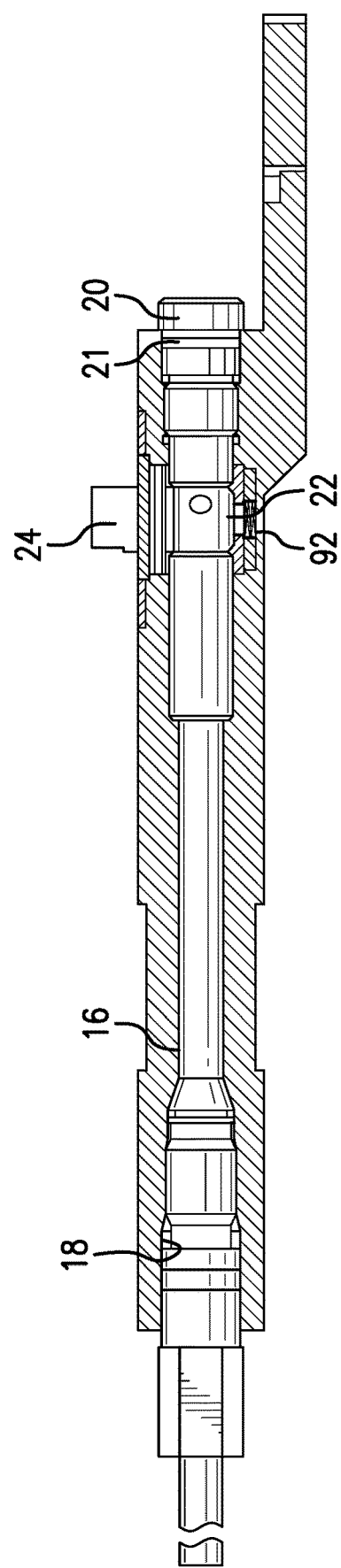
FIG. 2 is a cross sectional view of the male connector portion of FIG. 1.

Referring to FIGS. 1 and 2, a male connector portion 12 of a connection system 10 (see FIG. 10) is illustrated. The portion 12 comprises a housing 14. The housing 14 defines a conduit 16 (see FIG. 2) that extends from a tubing termination receptacle 18 to a stub guide 20 having a seal 21. Disposed between the tubing termination receptacle 18 and the stub guide 20 is a valve 22, which in one embodiment is a ball valve. The valve 22 in a closed position prevents communication between the receptacle 18 and the stub guide 20 until the valve 22 is moved to the open position. In operable communication with the valve 22 is a valve actuator 24 that is exposed to an outside of the housing 14. It will be appreciated that in the embodiment illustrated, the actuator 24 is configured as a shaft 26 having a keyed end 28. More specifically in the illustrated embodiment the end of the shaft 26 has half of the material removed. This facilitates rotational movement of the shaft about its own axis when the keyed end 28 interacts with another member that is brought into contact therewith. This will be clearer below after introduction of the female connector portion.

The housing 14 further includes a housing extension 30 that is configured and dimensioned to interact with a valve actuator of the female connector portion not yet numbered. The extension 30 functions both to align the male and female connector portions and to actuate the valve actuators.

Referring to FIGS. 3 and 4, a female connector portion 40 of connection system 10 is illustrated. It should be appreciated from the Figures that the portion 40 includes a housing 42 similar to that of FIG. 1. The housing 42 defines a conduit 44 (see FIG. 3) that extends from a tubing termination receptacle 46 to a stub collar 48 having a seal 50. Disposed between the tubing termination receptacle 46 and the stub collar 48 is a valve 52, which in one embodiment is a ball valve. The valve 52 in a closed position prevents communication between the receptacle 46 and the stub collar 48 until the valve 52 is moved to the open position. In operable communication with the valve 52 is a valve actuator 54 that is exposed to an outside of the housing 42. It will be appreciated that in the embodiment illustrated, the actuator 54 is configured as a shaft 56 having a keyed end 58 that is configured quite similarly if not identically to the valve actuator of FIG. 1. The shaft 56 then will experience the same rotational movement about its own axis when the keyed end 58 interacts with another member that is brought into contact therewith as did shaft 26.

The housing 42 further includes a housing extension 60 that is configured and dimensioned to interact with the valve actuator 24 of the male connector portion 12 in FIG. 1 when the male 12 and female 40 connector portions are mated.

Figure 7:
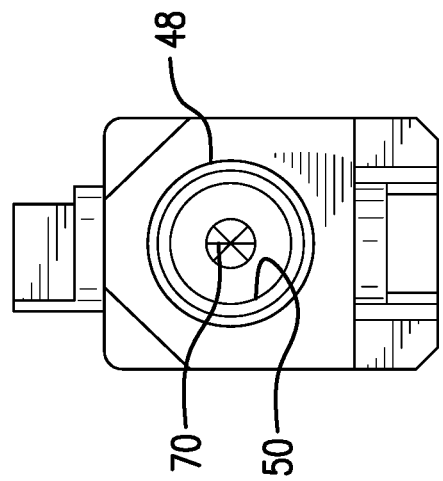
FIG. 7 is an end view of the view of FIG. 2 with a debris barrier installed.
Figure 6:
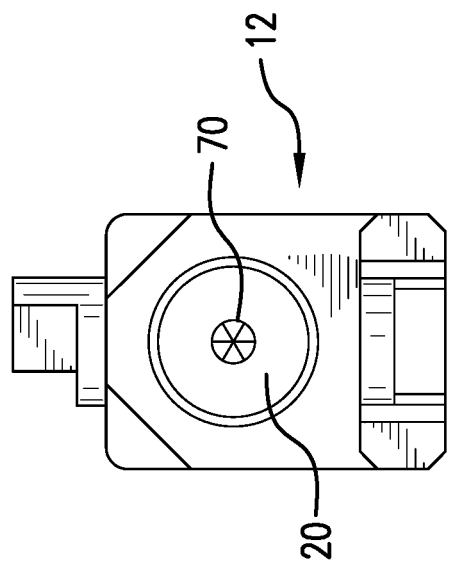
FIG. 6 is an end view of FIG. 1 with a debris barrier installed.
Figure 5:
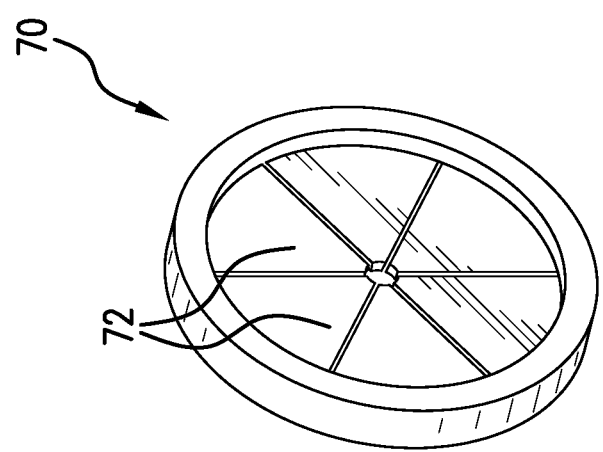
FIG. 5 is a perspective view of a debris barrier.

Referring to FIGS. 5-7, some embodiments may also include one or more debris barriers 70. Optional Barrier 70 comprises a flexible material such as an elastomer and is divided into a number of segments 72 (more or fewer than six are contemplated) to facilitate fluid or a conductor such as an electrical conductor or an optic fiber cable may pass therethrough after the male connector portion 12 and female connector portion 40 are mated to form the connection system herein described (see FIG. 10). In FIGS. 6 and 7, end views of the male and female portions illustrate a position of the barrier 70 in each case in some embodiments.

Figure 10:
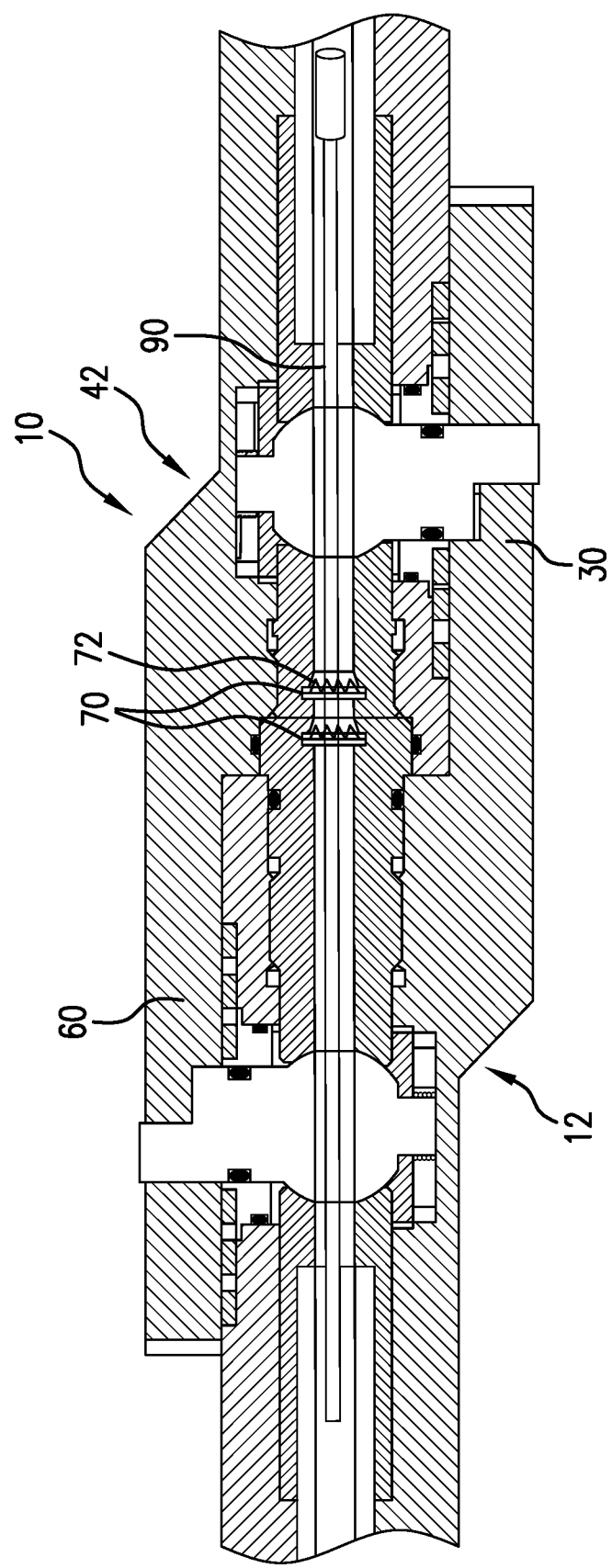
FIG. 10 is a cross sectional illustration of the male and female connector portions in a mated position and illustrating a conductor positioned in the conduit thereof.

Referring to FIGS. 8-10, the system 10 will be appreciated. Male connector portion 12 is oriented with female connector portion 42 as illustrated in FIG. 8. The portions 12 and 42 are then brought closer together. Depending upon which embodiment is used, the stub guide 20 may enter the stub collar 48 before the extensions 30 and 60 reach the opposing valve actuators 54 and 24, respectively, or after the extensions 30 and 60 reach the opposing valve actuators 54 and 24, respectively. In embodiments that cause stub guide 20 and stub collar 48 engagement before valve actuation, no fluid from the conduits 16 and 44 is lost to the environment. In embodiments in which the stub guide 20 and stub collar 48 engagement occurs after valve actuation, fluid from either conduit 16 or conduit 44 or both may escape to the environment assuming the fluid pressure within the conduits 16 and or 44 is higher than ambient pressure where the connection system is being used. Embodiments such as the latter might be selected where it is desired to flood the connection area with clean hydraulic fluid prior to mating guide stub 20 with guide collar 48.

In either embodiment noted, eventually the housing extensions 30 and 60 reach the opposing valve actuators 54 and 24 respectively and cause the shafts 26 and 56 to rotate about their own axes, which due to construction will cause the valves 52 and 22 to open. Referring to FIGS. 9A-9C, sequential views of the interaction between the housing extension 30 and the valve actuator 54 can be seen. In FIG. 9A, the actuator 54 is seen in a closed position with the housing extension 30 pushing on the valve actuator 54 at point 80. Since as will be appreciated by one of skill in the art from the drawing, the point 80 is not aligned with an axis 82 of the valve actuator, further movement in the direction of arrow 84 by the extension will continue to cause the valve actuator 54 to rotate resulting sequentially in the positions of actuator 54 illustrated in FIGS. 9B and 9C.

Finally, referring to FIG. 10, the connected connection system 10 is illustrated in cross section. It will be appreciated that conduits 16 and 44 are now connected in a single conduit that is capable of conveying fluid, housing an electrical conductor or an optic fiber cable and allowing such conductors to be pumped into a desired location through the connection system 10. It is noted that the illustrated embodiment here shows two debris barriers 70 with segments 72 deflected to allow passage of the conductor 90.

Again referring to FIGS. 2 and 4, one will note biasing member 92 and biasing member 94. These may be any type of configuration capable of becoming loaded during mating of the connection system 10 so that upon de-mating of the system 10, the valves 22 and 52 will automatically return to the closed position. In the illustrations, the biasing members 92 and 94 are torsion springs that will be attached to a part of the valve at one end and a part of the housing at the other end, thereby facilitating loading of the spring during opening of the valve so that the energy stored in the spring when the valve is open is available to close the valve when the opening impetus (discussed above) is removed from the valve. That valve will then automatically close based upon the spring energy acting thereon.

The connection system 10 may be employed in dry or wet conditions and is particularly useful in a downhole system where connections are required in the borehole. Borehole systems including the connection system 10 improve efficiency and reliability.

Set forth below are some embodiments of the foregoing disclosure:

Embodiment 1: A connection system including a male connector portion and a female connector portion each including a housing, a valve disposed within the housing, a valve actuator operably connected to the valve, and a housing extension, the housing extension from the male connector portion being configured to interact with the valve actuator of the female connector portion to open the valve of the female connector portion during mating of the male and female connector portions and the housing extension from the female connector portion being configured to interact with the valve actuator of the male connector portion to open the valve of the male connector portion during mating of the male and female connector portions.

Embodiment 2: The connection system as in any prior embodiment wherein the opening of the male connector portion valve and the opening of the female connector portion valve is simultaneous.

Embodiment 3: The connection system as in any prior embodiment wherein the male connector portion includes a stub guide.

Embodiment 4: The connection system as in any prior embodiment wherein the female connector portion includes a stub collar.

Embodiment 5: The connection system as in any prior embodiment wherein the housing extensions are configured and dimensioned such that during mating of the male and female connector portions, opening of the valves occurs prior to the stub guide and the stub collar being mated.

Embodiment 6: The connection system as in any prior embodiment wherein the housing extensions are configured and dimensioned such that during mating of the male and female connector portions, opening of the valves, during use, occurs subsequent to the stub guide and the stub collar being mated.

Embodiment 7: The connection system as in any prior embodiment wherein at least one of the valves is a ball valve.

Embodiment 8: The connection system as in any prior embodiment wherein at least one of the actuators comprises a geometry that causes the actuator to rotate to open the valve operably connected thereto.

Embodiment 9: The connection system as in any prior embodiment wherein the housing extensions for each of the male and female connector portions simultaneously assist in aligning the male and female connector portions during mating.

Embodiment 10: The connection system as in any prior embodiment wherein at least one of the male and female connector portions includes a debris barrier.

Embodiment 11: The connection system as in any prior embodiment wherein both of the male and female connector portions include a debris barrier.

Embodiment 12: The connection system as in any prior embodiment wherein the debris barrier is flexible.

Embodiment 13: The connection system as in any prior embodiment wherein the debris barrier is configured to substantially exclude debris prior to mating and to allow passage of fluid or a conductor subsequent to mating.

Embodiment 14: The connection system as in any prior embodiment further including a biasing member operably connected to the valve and configured to bias the valve to a closed position.

Embodiment 15: A connector including a housing, a valve disposed in the housing, a valve actuator in operable communication with the valve, the actuator exposed to an exterior of the housing, the actuator configured to interact with a member of another structure during mating of the connector to the another structure to actuate the valve.

Embodiment 16: A method for connecting a conduit including bringing the male connector portion and the female connector portion as in any prior embodiment into alignment, engaging the housing extensions with the other of the male or female connector portions, interacting at least one of the housing extensions with the valve actuator of the connector portions, and opening at least one valve of the male and female connector portions.

Embodiment 17: The method as in any prior embodiment wherein the male connector portion includes a stub guide and the female connector portion includes a stub collar and the opening occurs prior to the stub guide and stub collar mating.

Embodiment 18: The method as in any prior embodiment wherein the male connector portion includes a stub guide and the female connector portion includes a stub collar and the opening occurs subsequent to the stub guide and stub collar mating.

Embodiment 19: The method as in any prior embodiment wherein the method further includes passing a conductor through the mated male and female connector portions.

Embodiment 20: A borehole system comprising a connection system as in any prior embodiment.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A connection system comprising:
  a male connector portion having a stub guide and a female connector portion having a stub collar, each of the male connector portion and the female connector portion including:
    a housing;
    a valve disposed within the housing;
    a valve actuator operably connected to the valve; and
    a housing extension, the housing extension from the male connector portion being configured to interact with the valve actuator of the female connector portion to open the valve of the female connector portion during mating of the male and female connector portions and the housing extension from the female connector portion being configured to interact with the valve actuator of the male connector portion to open the valve of the male connector portion during mating of the male and female connector portions, wherein the housing extensions are configured and dimensioned such that during mating of the male and female connector portions, opening of the valves occurs prior to the stub guide and the stub collar being mated.

2. The connection system as claimed in claim 1 wherein the opening of the male connector portion valve and the opening of the female connector portion valve is simultaneous.

3. The connection system as claimed in claim 1 wherein at least one of the valves is a ball valve.

4. The connection system as claimed in claim 1 wherein at least one of the actuators comprises a geometry that causes the actuator to rotate to open the valve operably connected thereto.

5. The connection system as claimed in claim 1 wherein the housing extensions for each of the male and female connector portions simultaneously assist in aligning the male and female connector portions during mating.

6. The connection system as claimed in claim 1 wherein at least one of the male and female connector portions includes a debris barrier.

7. The connection system as claimed in claim 6 wherein both of the male and female connector portions include a debris barrier.

8. The connection system as claimed in claim 6 wherein the debris barrier is flexible.

9. The connection system as claimed in claim 6 wherein the debris barrier is configured to substantially exclude debris prior to mating and to allow passage of fluid or a conductor subsequent to mating.

10. The connection system as claimed in claim 1 further including a biasing member operably connected to the male connector portion valve or the female connector portion valve and configured to bias the male connector portion valve or the female connector portion valve to a closed position.

11. A method for connecting a conduit comprising:
  bringing the male connector portion and the female connector portion as claimed in claim 1 into alignment;
  engaging the housing extensions with the other of the male or female connector portions;
  interacting at least one of the housing extensions with the valve actuator of the connector portions; and opening at least one valve of the male and female connector portions prior to the stub guide and stub collar connecting.

12. The method as claimed in claim 11 wherein the method further includes passing a conductor through the mated male and female connector portions.

13. A borehole system comprising a connection system as claimed in claim 1.

14. A connector comprising:
a housing having a stub collar or a stub guide;
a valve disposed in the housing;
a valve actuator in operable communication with the valve, the actuator exposed to an exterior of the housing, the actuator configured to interact with a member of another structure during mating of the connector to the another structure to actuate the valve prior to the stub collar or stub guide being mated with a corresponding stub color or stub guide of the another structure.

* * * * *